United States Patent [19]

Ronning

[11] Patent Number: 4,813,154
[45] Date of Patent: Mar. 21, 1989

[54] METHOD AND APPARATUS FOR CONDITIONING FIBROUS MATERIALS

[76] Inventor: Richard L. Ronning, 9714 W. 91 Ter., Overland Park, Kans. 66212

[21] Appl. No.: 56,451

[22] Filed: Jun. 1, 1987

[51] Int. Cl.$^4$ .............................. F26B 3/10; F26B 3/06
[52] U.S. Cl. ........................................... 34/25; 34/137
[58] Field of Search ............... 34/56, 137, 46, 135, 34/136, 35, 86, 25

[56] References Cited

U.S. PATENT DOCUMENTS

| | | | |
|---|---|---|---|
| 1,173,188 | 2/1916 | Hetherington | 34/137 |
| 3,021,202 | 2/1962 | Peirce et al. | 34/137 |
| 3,943,637 | 3/1976 | Hanser | 34/56 |
| 3,948,277 | 4/1976 | Wochnowski et al. | 34/45 |
| 4,346,523 | 8/1982 | Ronning | 34/137 |

Primary Examiner—Henry A. Bennet
Attorney, Agent, or Firm—Hovey, Williams, Timmons & Collins

[57] ABSTRACT

An apparatus for cooling and conditioning chopped, fibrous materials such as chopped alfalfa, wood chips or the like includes a rotatable drum having helical flights for advancing materials as well as a series of radial flights that selectively retard portions of the fibrous materials. A spray apparatus located within upstream regions of the drum directs a spray of water and additives such as binders and preservatives toward the materials, while an induced stream of air flowing through the drum in countercurrent relationship to the advancement of materials causes cooling of the latter by conduction as well as evaporation. Relatively finer and therefore drier portions of the fibrous materials are directed rearwardly by the countercurrent stream of air back toward the spray apparatus to thereby increase the moisture content of the same and equilibrate with regard to the moisture content of remaining portions of the fibrous materials. The drum rotates slowly to mix and condition the materials and also functions as an accumulator in case upstream or downstream processes are interrupted.

3 Claims, 2 Drawing Sheets

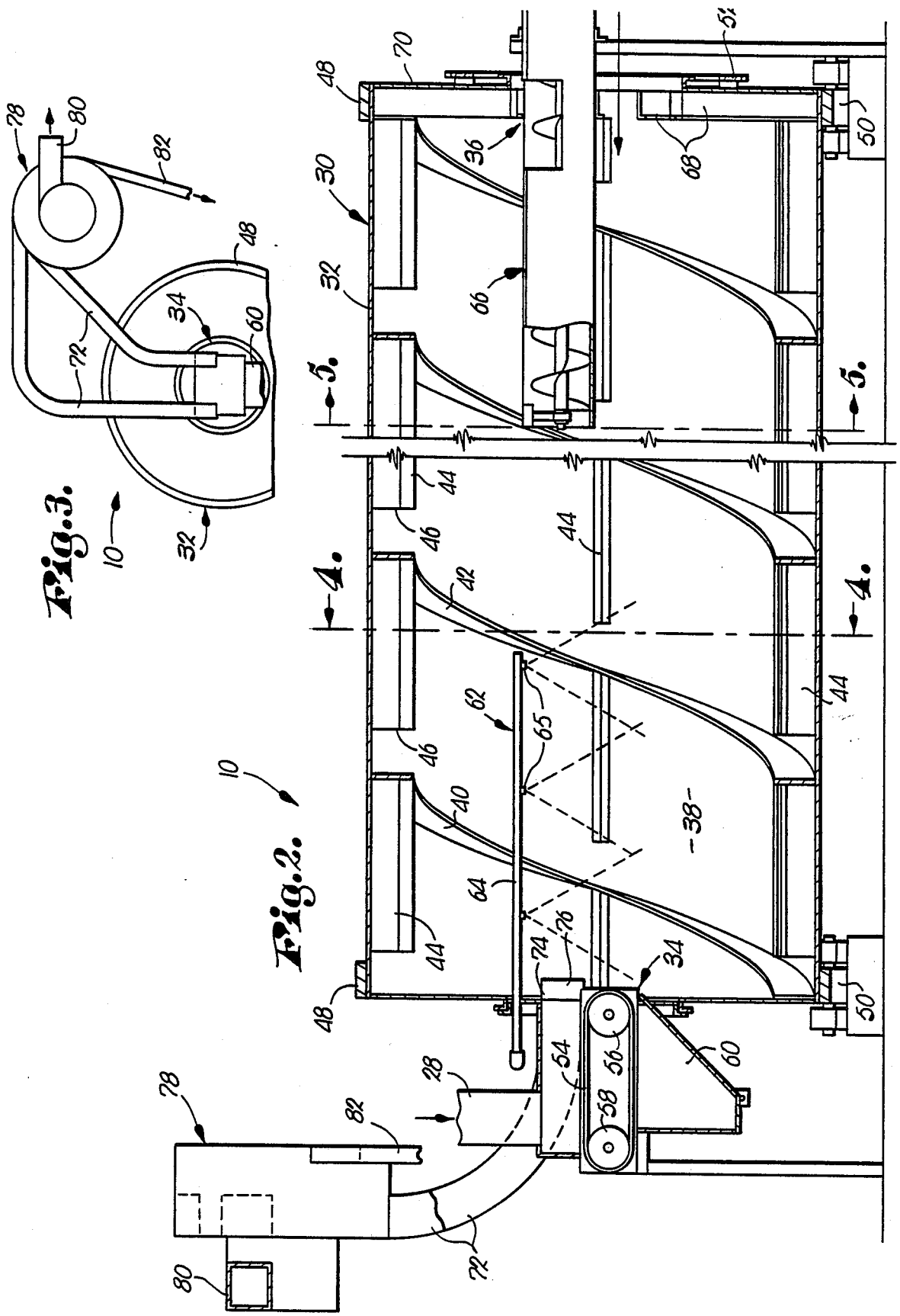

METHOD AND APPARATUS FOR CONDITIONING FIBROUS MATERIALS

Background of the Invention

1. Field of the Invention

This invention relates to a conditioner for fibrous materials such as chopped forage or wood chips, and the apparatus takes the form of a rotatable drum which receives irregularly dried, relatively high temperature materials and cools the same while equalizing the moisture content throughout all portions of the materials. The conditioning drum has helical flights for advancing the substances and a series of radial flights disposed in transverse relation to the helical flights for retarding portions of the substances. In accordance with the method of conditioning and cooling fibrous materials, air is drawn into the drum in countercurrent relationship to the flow of materials therethrough to provide both evaporative and conductive cooling, and smaller, relatively drier portions of the materials are retarded and directed upstream by the flow of air toward spray apparatus, thereby achieving equilibration of moisture content throughout all portions of the substances passing through the conditioner.

2. Description of the Prior Art

Over the years, there has been increased demand for alfalfa products which have been processed to serve as a premium, supplemental feed for horses and other livestock. Historically, the alfalfa products are ground to a relatively small size and pelletized by an extruder. Recently, there has been an increased interest in alfalfa products which have instead been chopped and cubed, since the coarser ingredients comprising the cubes provide greater roughage for livestock. In addition, less energy is required to cube the alfalfa than would be necessary for grinding and pelletizing the same.

Typically, some type of accumulating and distribution tank or bin is provided upstream of the pellet mill or cuber in an attempt to retain and uniformly feed over a period of time a somewhat uniform flow rate of the alfalfa to the pellet mill or cuber. Such holding tanks often take the form of a live bottom metering box which provides some mixing of the products and has outlet augers for feeding the products to the pelletizer or cuber. Unfortunately, it is difficult for the metering box to uniformly feed coarser materials (i.e., chopped materials greater than about ¾ inch in length) which are often utilized in the manufacture of cubes. Bridging of the materials often occurs in metering bins and necessitates manual intervention to avoid continued interruption of the process.

Furthermore, it is often desired to add molasses and other ingredient additives to the chopped alfalfa before conversion into cubes or pellets. Metering bins, however, do not provide satisfactory mixing of the material for addition of liquid additives and instead the chopped materials often enter the cuber with substantial variation in the moisture content over a period of time. For example, chopped stems and stalks have a greater ability to retain moisture than finer products which may readily dry before reaching the cuber or pelletizer.

Chopped forage which is not adequately dried in the field is normally passed through a drier before reaching the cubing operation. However, chopped stems suitable for cubing are sometimes up to two or three inches in length, and as can be appreciated these larger ingredients have a greater ability to retain moisture than do their smaller counterparts. Unfortunately, it is difficult to satisfactorily cube alfalfa products which have not been dried to a uniform moisture content.

It would be a desirable advance in the art to provide apparatus for selectively conditioning, cooling and drying fibrous materials such as chopped alfalfa so that the materials can be subsequently introduced to a downstream process operation such as a cuber or pelletizer at a uniform flow rate and with little, if any, temperature or moisture with variations from one portion of the material to another. Advantageously, such a device would provide for temporary retention and accumulation of the material so that upstream or downstream operations could be momentarily interrupted without adversely affecting to a significant degree the product output in terms of tons per hour.

SUMMARY OF THE INVENTION

My present invention overcomes the abovenoted disadvantages by provision of a conditioning apparatus which is operable to uniformly feed chopped materials over extended periods of time to a cuber, pelletizer or other processing operation. The apparatus uniformly cools chopped materials and equalizes the moisture content throughout all portions of the same, and continuous mixing of the materials is provided along with an optional spray apparatus which may be used to add water, preservatives, molasses, minerals or other supplements.

In more detail, the conditioning apparatus takes the form of a rotatable drum which is provided with helical flighting for advancing materials through the drum as well as a series of radial flights which are oriented in transverse relationship to the helical flighting for retarding the advancement of portions of the materials. The trailing edge of each radially oriented flight is spaced somewhat from the next adjacent, upstream portion of the helical flighting so that certain of the materials are passed through the space between the radial flighting and the helical flighting and other portions of the materials are somewhat retarded. The flighting provides uniform mixing of the materials as the drum is slowly rotated at a speed typically within a range of one to three revolutions per minute.

The conditioning apparatus includes a blower for directing air through the drum in countercurrent relationship to materials advancing through the same. The counterflowing air provides a greater temperature rise in the air and corresponding temperature reduction in the materials, while the elevated temperature of the air provides a significant degree of evaporative cooling of the materials which is enhanced by the fact that air at elevated temperatures is capable of carrying a greater amount of water vapor than air at lower temperatures. Continuous mixing of the products within the drum further equalizes the temperature distribution throughout the products by promoting conduction of heat from one portion of the chopped materials to another.

A spray apparatus mounted within upstream regions of the drum is operable to direct water having additives such as preservatives, molasses and minerals to the materials as the latter advance along initial regions of the drum. The relatively large capacity of the drum ensures that the wetted materials will be adequately mixed so that the outflowing products are conditioned and exhibit a substantially uniform moisture content.

Importantly, the air flowing through the drum in countercurrent relationship to the advancement of the materials therein passes through the materials as the same tumble and toss about within the drum. Those portions of the materials which are finer and consequently drier than other portions of the materials are inherently of less weight than the remaining portions, and are drawn upstream somewhat by the counterflowing air in a direction back toward the spray apparatus. As a result, the finer, drier products which have been retarded or directed upstream receive additional moisture from the spray apparatus or by contact with other, relatively wetter materials exiting the spray region thereby ensuring that the moisture content throughout all portions of the materials is of a relatively constant value.

BRIEF DESCRIPTION OF THE DRAWINGS

FIG. 2 is a fragmentary, enlarged, side cross-sectional view of the cooling and conditioning drum shown in FIG. 1;

FIG. 3 is a fragmentary, front elevational view of the upstream end of the drum shown in FIG. 2, also illustrating a blower which is provided for inducing a flow of air through the drum in countercurrent relationship to the advancement of fibrous products therethrough;

DETAILED DESCRIPTION OF THE DRAWINGS

Figure 1:
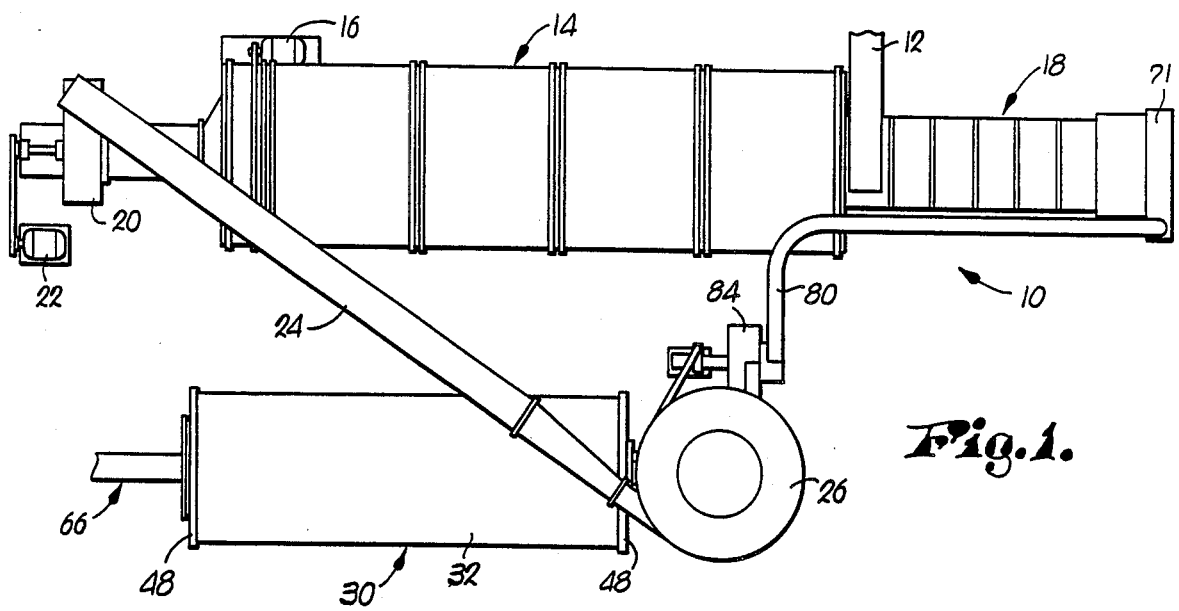
FIG. 1 is a fragmentary, plan view of processing apparatus for fibrous materials wherein is shown a rotary drier drum as well as a cooling and conditioning drum constructed in accordance with the principles of my present invention.

A processing apparatus for fibrous material such as chopped forage, wood fibers or the like is broadly designated by the numeral 10 in FIG. 1. The materials are advanced to the apparatus a holding bin (not shown) by means of an inclined screw conveyor 12 which leads to a dryer 14. The dryer 14 is in the nature of a tubular, cylindrical drum which is rotatable about its central, horizontal axis by means of a motor 16, and a furnace 18 supplies heated air to the dryer 14 in order to elevate the temperature and decrease the moisture content of the materials passing therethrough.

The outlet of dryer 14 communicates with a fan 20 powered by a motor 22, and the fan 20 is operable to pneumatically convey the heated fibrous materials along a conduit 24 that extends to a primary, cyclone-type separator 26. Heated air from the dryer 14 and the conduit 24 is discharged out an open top of the separator 26, while the solid materials descend to an outlet 28 which is shown in FIG. 2.

Figure 4:
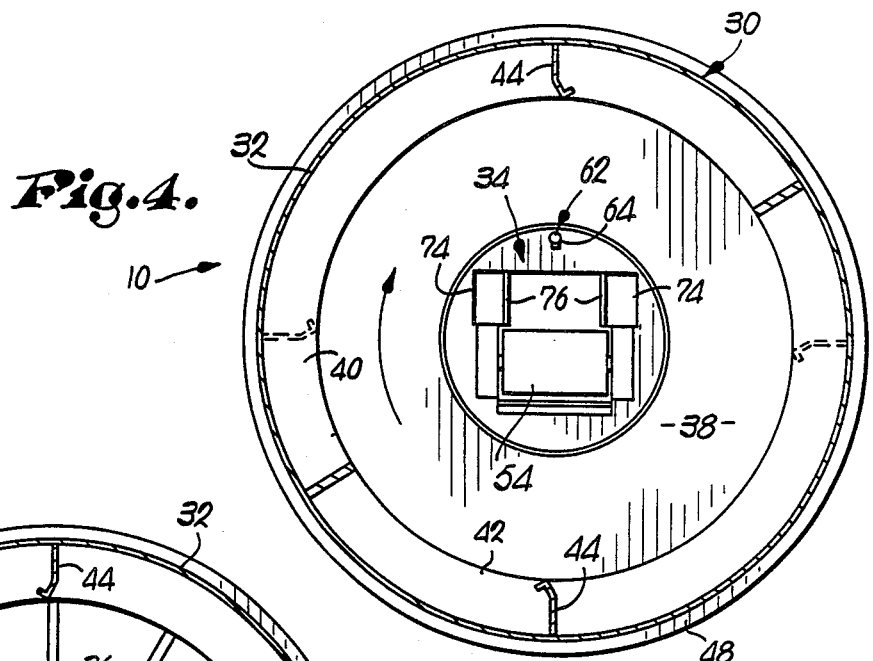
FIG. 4 is a cross-sectional view taken along line 4—4 of FIG. 2 and depicting inner, upstream regions of the conditioning drum.
Figure 5:
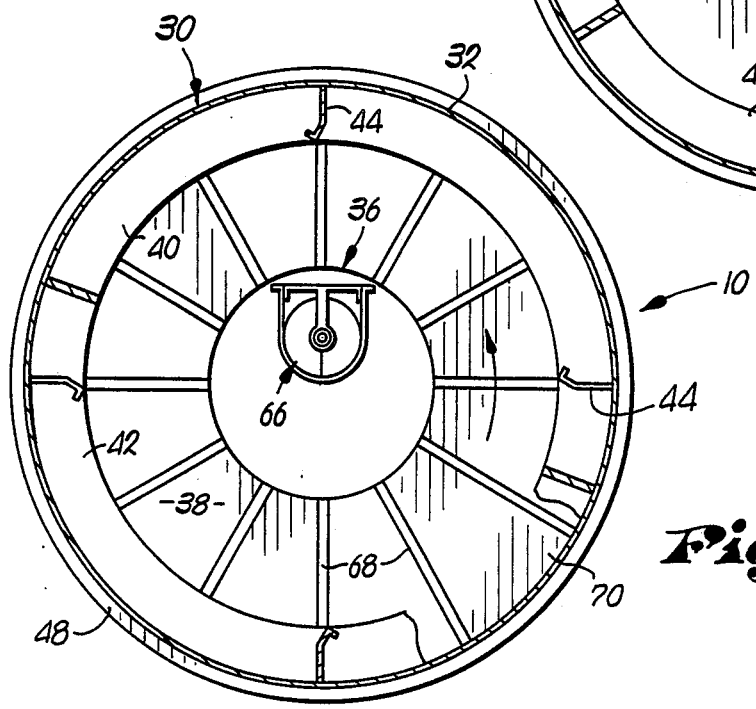
FIG. 5 is a side cross-sectional taken along line 5—5 of FIG. 2 and illustrating downstream regions of the conditioning drum with helical flighting broken away in section to reveal the full length of end mounted discharge scoops.

A cooling and conditioning drum 30, as best seen in FIGS. 2, 4 and 5, is comprised of a tubular, generally cylindrical housing 32 presenting an inlet 34, an outlet 36 and a chamber 38 communicating the inlet 34 with the outlet 36. The drum 30 is provided with a first flighting means which takes the form of two helical flights 40, 42 that are fixedly connected to the housing 32. In addition, a second flighting means comprises a number of radially extending flights 44 that are rigidly connected to the housing 32.

The inner end of each radial flight 44 is somewhat hook shaped (see FIGS. 4 and 5), and each flight 44 extends along a central axis of the drum 30 in a generally transverse relationship to the direction of extension of helical flights 40, 42. As represented in FIGS. 4 and 5, four rows of radial flights 44 are presented, each row being offset 90° around the housing 32 from the next adjacent row of flights 44. In addition, each flight 44 presents a trailing end 46 (FIG. 2) which is spaced from the next adjacent, upstream region of the helical flight 40 or 42.

Each end of the conditioning drum 30 is provided with an annular rim 48 that circumscribes the housing 32. Each of the rims 48 rides upon a respective wheel 50 that supports drum 30 for rotation about its central, horizontal axis. The downstream end of drum 30 is rigidly connected to a sprocket 52 which receives a roller chain driven by a motor (not shown) and which functions as a means for rotating the drum 30 about its central reference axis.

Viewing FIG. 2, solid, fibrous material discharged through the outlet 28 of separator 26 falls onto a conveyor belt 54 which is trained about two pulleys 56, 58. Pulley 56 extends through the inlet 34 of the housing 32 and is comprised of a magnetized material so that any metallic particles present in the chopped fibrous products do not enter the chamber 38, but instead travel around the pulley 58 until dropping into a disposal bin 60.

A spray apparatus 62, as shown in FIGS. 2 and 4, includes an elongated pipe 64 that extends throughout an inlet or upstream region of the housing 32; the aforesaid upstream region is of a length approximating 20-25% of the overall length f housing 32 Three nozzles 65 are secured to the underside of pipe 64 for directing a liquid spray comprised of water as well as other optional ingredients such as preservatives, molasses and the like.

A screw conveyor 66 is disposed along the axis of housing 32 within a downstream region of drum 30, and the conveyor 66 extends through the housing outlet 36 (see also FIG. 1) for transporting materials cooled and conditioned by the drum 30 to a cuber. The screw or auger-type conveyor 66 has a variable speed drive for selectively adjusting the flow rate of materials discharged from the drum 30, and the conveyor 66 is also reversible in case rapid interruption of the flow rate of materials to the cuber is desired.

Referring now to FIGS. 2 and 5, a plurality of discharge flights or scoops 68 are oriented in radial fashion relative to the central axis of housing 32 and are rigidly fixed to an end wall 70 of drum 30. Each of the discharge scoops 68 has an outer marginal edge portion of an L-shaped configuration for carrying fibrous materials upwardly during rotation of the drum 30 until reaching a position above the screw conveyor 66. A portion of the top of the conveyor 66, as well as a portion of one side of the latter is removed as depicted in FIG. 2 for receiving materials that are carried upwardly by the scoops 68 and which fall upon reaching upper reaches of the chamber 38.

A means for directing air through the chamber 38 includes a fan 71 associated with the dryer 14 (FIG. 1) as well as two discharge conduits 72 (FIGS. 2 and 3) that each include an inlet port 74 that extends through a front or upstream wall 76 of housing 32. As can be appreciated by reference to FIG. 4, the ports 74 are located on opposite sides of an area above the belt 54 through which the fibrous materials are introduced into the chamber 38. The inner side of each port 74 includes a rectangular extension 76 (FIGS. 2 and 4) to ensure that materials advanced along the belt 54 are not drawn into the discharge conduits 72 by the flow of outgoing air.

As illustrated in FIG. 3, each of the air discharge conduits 72 leads to a separator 78 having an air outlet that communicates with a duct 80 (FIGS. 1 and 3) for returning air back to the inlet of fan 20. Fine particulate matter discharged by the separator 78 descends through piping 82 that leads to a motor-driven blower 84 (FIG. 1) for pneumatically transporting the fines to the separator outlet 28, for return to chamber 38.

Operation

In use of the apparatus 10, fibrous materials introduced through screw auger 12 into dryer 14 are heated and partially dried by air exiting the furnace 18. Upon leaving the dryer 14, the materials are transported by fan 20 through conduit 24 to the primary collector 26, whereupon the particulate materials descend through the outlet 28 and onto the drum 30 while the heated air is discharged out the top of collector 26. The inlet belt 54 then conveys the materials in steady-flow fashion through drum inlet 34 and into chamber 38.

As the fibrous materials reach the chamber 38, drum 30 is rotated about its central axis to cause the helical flights 40, 42 to slowly advance the materials toward the drum outlet 36. However, as the materials are pushed forwardly by the helical flights 40, 42 the radially extending flights 44 tend to engage a portion of the material and mix as well as retard the advancement of the same. The spacing between the trailing edge of each flight 44 and the adjacent, upstream regions of the flight 40 or 42 serves to enable a portion of the fibrous material to advance along the central axis of drum 30, while the remaining portions of the material are retarded due to the influence of flights 44.

The spray apparatus 62 directs a pressurized spray of water, preservatives, molasses and other additives to the fibrous materials as the latter pass through initial sections of the chamber 38. In addition, the fibrous materials are exposed to air flowing in a countercurrent direction through the chamber 38 by operation of fan 71 which draws air through the discharge conduits 72 and the separator 78.

Once the fibrous materials have reached downstream regions of the chamber 38, the discharge scoops 68 function to lift the materials to a location above the screw conveyor 66 for introduction into the same. Referring to FIG. 5, when the drum 30 is rotated as indicated by the arrow, each scoop 68 lifts a portion of the fibrous materials, and once the scoop 68 is at a sufficient height the lifted materials will fall and consequently enter the opening provided in the top and one side of conveyor 66. The materials are advanced by the screw conveyor 66 toward a downstream cubing operation although other downstream processing apparatus such as a pelletizer could also be employed.

Advantageously, the air flowing in countercurrent relationship to the normal advancement of the fibrous materials through the drum 30 provides efficient cooling of the fibrous materials before the same reach the screw conveyor 66. Air drawn into the drum 30 at a normal atmospheric temperature of 70°-90° F. first contacts portions of the material closest to the conveyor 66, so that the materials which are about to be discharged are exposed to the coldest possible air. Air reaching the discharge conduit 72 may have a temperature of 130°-140° F. which is sufficient for providing some degree of cooling to the relatively hot materials as the latter are continuously discharged from the dryer 14.

Importantly, the provision of the countercurrent flow of air through the housing 32 causes a portion of the fibrous materials to be directed somewhat by the airstream in reverse fashion and back toward the spray apparatus 62. Specifically, relatively fine particles or portions of the fibrous materials, which inherently dry quickly in the dryer 14 and therefore have a relatively low moisture content as well as a relatively small weight, are influenced by the countercurrent flow of air and are drawn or pneumatically conveyed in a reverse direction back toward the spray apparatus 62. In some instances, the fine materials reach the regions of the housing 32 exposed to spray from the apparatus 62 such that the moisture content of the fines increases. In other cases, the finer materials will simply be retarded somewhat which consequently causes additional mixing to occur with the relatively wet materials, and such mixing tends to condition both the wet and dry materials until an equilibrium of moisture content is attained.

The drum 30 may be operated with varying loads of fibrous materials within the chamber 38 without adversely affecting to a significant degree the cooling and conditioning effects occurring therein. In this regard, the drum 30 functions as an accumulator for both upstream and downstream processes in case temporary process interruption is necessitated. Moreover, by retaining and mixing the materials within the drum 30 over a period of time, the moisture content and temperature distribution of the materials tends to equalize from one portion to another.

In one example, the drum 30 was constructed such that the housing 32 was approximately ten feet in diameter. Satisfactory cooling and conditioning of the fibrous materials was observed when the throughput of the same was in the range of one to eight tons per hour and retained in the drum 30 for a period of time within the range of five to 45 minutes. When the chamber 38 was approximately one-third full of fibrous materials, the flow rate of materials through the drum 30 was approximately four ton per hour and a retention time of about 30 minutes was observed.

The cooling and conditioning drum 30 of the present invention is particularly useful for conditioning chopped alfalfa where stems and stalks of the alfalfa may range from two to three inches in overall length and, in addition, significant quantities of smaller materials may be present. The drum 30 cools and conditions the alfalfa without bridging problems associated with prior art metering boxes and yet is operable to steadily feed the materials through the screw conveyor 66 to downstream processing apparatus as may be necessary.

Those skilled in the art will appreciate that a number of details of the preferred embodiment described for purposes of illustrating the invention could be modified without departing from the gist and essence of my invention. Moreover, the drum 30 may be successfully used for conditioning other fibrous materials such as wood particles and the like as may be desired for production of particle board, wafer board or chip board. As such, it should be understood that the invention is to be limited only by the fair scope of the claims that follow and their mechanical equivalents thereof.

I claim:

1. A method of cooling and conditioning fibrous materials comprising the steps of:
    introducing a quantity of fibrous materials through an inlet and into a chamber of a rotatable drum having generally helical-shaped flighting means;
    rotating the drum to advance the material in a certain direction along the length of the drum toward an outlet;
    adding a quantity of water to said materials in the drum at a location adjacent said inlet and spaced upstream from said outlet; and
    directing a stream of atmospheric air at generally ambient temperature through said drum in a direction opposite to siad direction of advancement of materials in the drum in order to cool the materials, said step of directing said stream of air through said drum including the step of causing said air to flow through the drum at a velocity sufficient to suspend and pneumatically convey lighter, relatively drier portions of said materials back toward said certain location in order to cause the moisture content of the relatively drier portions to be increased.

2. The invention as set forth in claim 1, wherein said step of adding a quantity of water to said materials in the drum includes the step of spraying said quantity of water through nozzle means, and whereinsaid step of causing said air to flow through the drum at velocities sufficient to suspend and pneumatically convey portions of said materials back toward said location includes the step of conveying some of said portions along a path beneath the spray provided by said nozzle means.

3. The method as set forth in claim 1, and including the step of discharging said materials from said drum at a rate different from the rate of feeding materials into said drum by use of a variable speed discharge converyor operable to convey materials in either direction through said outlet.

* * * * *